(12) United States Patent
Rácz et al.

(10) Patent No.: US 7,327,740 B2
(45) Date of Patent: Feb. 5, 2008

(54) FACILITATING RELIABLE CONNECTION ADMISSION CONTROL FOR TELECOMMUNICATIONS SYSTEM USING AAL2 SIGNALING

(75) Inventors: Sándor Rácz, Cegléd (HU); Szabolcs Malomsoky, Szentendre (HU); István Szabó, Karcag (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 855 days.

(21) Appl. No.: 10/143,826

(22) Filed: May 14, 2002

(65) Prior Publication Data

US 2002/0176360 A1 Nov. 28, 2002

Related U.S. Application Data

(60) Provisional application No. 60/293,166, filed on May 25, 2001.

(51) Int. Cl.
*H04L 12/28* (2006.01)
(52) U.S. Cl. .................... 370/395.6; 370/522
(58) Field of Classification Search .......... None
See application file for complete search history.

(56) References Cited

U.S. PATENT DOCUMENTS

| | | | |
|---|---|---|---|
| 6,169,738 B1 * | 1/2001 | Sriram et al. | 370/395.21 |
| 6,563,816 B1 * | 5/2003 | Nodoushani et al. | 370/352 |
| 6,567,425 B1 * | 5/2003 | Szabo et al. | 370/522 |
| 6,711,126 B1 * | 3/2004 | Besset-Bathias | 370/229 |
| 6,725,038 B1 * | 4/2004 | Subbiah | 455/436 |
| 6,826,188 B2 * | 11/2004 | Lo et al. | 370/395.6 |
| 2003/0161325 A1 * | 8/2003 | Kekki | 370/395.43 |
| 2004/0202172 A1 * | 10/2004 | Andersson et al. | 370/395.1 |

FOREIGN PATENT DOCUMENTS

| | | |
|---|---|---|
| EP | 0 915 634 A2 | 5/1999 |
| WO | 00/07407 A1 | 2/2000 |

OTHER PUBLICATIONS

ITU-T Recommendation !.2630.1, International Telecommunication Union, Series Q: Switching and Signalling Bradband ISDN—Common Aspects of B-ISDN Application Protocols for Access Signalling and Network Signalling and Interworking; AAL Type 2 Signalling Protocol—Capability Set 1; Dec. 1999.

(Continued)

*Primary Examiner*—Bob A. Phunkulh
(74) *Attorney, Agent, or Firm*—Nixon & Vanderhye, P.C.

(57) ABSTRACT

In a telecommunications network, for establishing or modifying a radio connection a node ($N_1$) prepares and sends an AAL2 signaling message (110) for use by a connection admission control function (106) of another node ($N_2$) of the telecommunications network. In accordance with the present invention, the AAL2 signaling message includes a timescale value (112) which represents a timescale over which at least one bit rate value characterizing the radio connection is defined. Including the timescale value (112) in the AAL2 signaling message (110) facilitates more efficient connection admission control by enabling, e.g., bandwidth requirements of radio connections to take into consideration delay requirements. In an illustrated example embodiment, the timescale value (112) is a burst inter-arrival time (BIT) bit value which is a time which elapses between a beginning of two subsequent bursts of AAL2 CPS (Common Part Sublayer) packets.

33 Claims, 7 Drawing Sheets

OTHER PUBLICATIONS

International Search Report mailed Sep. 11, 2002.

Fodor et al, "Comparison of Cell Admission Control Algorithms in ATM/AAL2 Based 3rd Generation Mobile Access Networks", Wireless Communications and Networking Conference, 1999, WCNC 1999 IEEE New Orleans, LA, US Sep. 21-24, 1999, Piscataway, NJ, US, IEEE, US Sep. 21, 1999, pp. 1508-1512.

* cited by examiner

| Field No. | Field |
|---|---|
| 1 | Maximum CPS-SDU bit rate |
| 2 | Average CPS-SDU bit rate |
| 3 | Maximum CPS-SDU size |
| 4 | Average CPS-SDU size |
| 5 | Burst Interval-arrival Time |

Fig. 3

| 8 | 7 | 6 | 5 | 4 | 3 | 2 | 1 | |
|---|---|---|---|---|---|---|---|---|
| | | | | | | | | Octet 1 |
| | | | Burst Inter-arrival Time | | | | | Octet 2 |

Fig. 4

| Parameter | 8 | 7 | 6 | 5 | 4 | 3 | 2 | 1 |
|---|---|---|---|---|---|---|---|---|
| | Pass-on not possible | Send notification indicator | Instruction indicator | Instruction indicator | general action | | | |
| | | | | | | | | instruction indicator |
| Enhanced Link Characteristics (ELC) in ERQ message | 0 R | 0 1 | 1 send notification | 0 1 discard parameter | 0 | 0 | 1 send notification | 0 0 pass on parameter |
| Enhanced Link Characteristics (ELC) in MOD message | 0 | 0 | 0 do not send notification | 0 1 discard parameter | 0 | 0 | 0 do not send notification | 0 0 pass on parameter |

FACILITATING RELIABLE CONNECTION ADMISSION CONTROL FOR TELECOMMUNICATIONS SYSTEM USING AAL2 SIGNALING

This application claims the benefit and priority of the following U.S. provisional patent application No. 60/293,166 filed May 25, 2001, entitled Facilitating Reliable Connection Admission Control for Telecommunications System Using AAL2 Signaling, which is incorporated herein by reference in its entirety.

BACKGROUND

1. Field of the Invention

This invention pertains to connection admission control in a telecommunications system, and particularly to connection admission control for such systems when AAL2 protocol signaling is employed.

2. Related Art and Other Considerations

Asynchronous Transfer Mode (ATM) is becoming increasingly used in communication networks. ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

Between termination points of an ATM network a plurality of nodes are typically situated, such as switching nodes having ports which are connected together by physical transmission paths or links. The switching nodes each typically have several functional parts, a primary of which is a switch core. The switch core essentially functions like a cross-connect between ports of the switch. Paths internal to the switch core are selectively controlled so that particular ports of the switch are connected together to allow a cell ultimately to travel from an ingress side of the switch to an egress side of the switch.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa. There are several differing AAL types or categories, including AAL0, AAL1, AAL2, AAL3/4, and AAL5.

AAL2 is a standard defined by ITU recommendation I.363.2. An AAL2 packet comprises a three octet packet header, as well as a packet payload. When desired, plural AAL2 packets can be inserted into a standard ATM cell.

ATM AAL2 is the standardized transmission technology for a radio access network known as the UMTS Terrestrial Radio Access Network (UTRAN). In the UTRAN, a switched AAL2 network interconnects radio base station (RBS) nodes (also more recently known as Node B or B-node) and radio network controller (RNC) nodes, and further connects the whole radio access network to the core network via the $I_u$ interface.

Typically, telecommunications networks are conceptualized as having certain layers, such as a call layer and a transport layer. In a telecommunications network such as the UTRAN, nodes of the network through which a connection is to be routed have a connection admission control function which determines, during attempted set up or modification of the connection, whether transport network resources in a transport layer can be successfully allocated for the sought connection. It is quite important to have a connection admission control function that allocates transport network resources in a reliable way. "Reliable" means that transport resources are allocated such that there is a high probability that the quality of service (QoS) requirements for the connection can be met.

In the UTRAN, a signaling protocol known as AAL2 Signaling is used to control the establishment of the AAL2 connections. The AAL2 Signaling includes two basic capability sets, known as AAL2CS1 and AAL2CS2 [respectively described in ITU-T Recommendation Q.2630.1 AAL Type 2 Signalling Protocol (Capability Set 1) and ITU-T Recommendation Q.2630.1 AAL Type 2 Signalling Protocol (Capability Set 2)]. One such signaling message of the AAL2 protocol (Establish Request) travels through the AAL2 switching network and carries (e.g., includes) certain information such as the destination address of the message and the resource requirement of the new connection. Each intermediate AAL2 node consults the Establish Request signaling message to check the resource requirement of the new connection. Such nodes then execute a connection admission control algorithm or function to determine whether those nodes can accommodate the new AAL2 connection. If the decision is positive the signaling message proceeds towards the remote destination endpoint.

In the AAL2 protocol Establish Request message, a parameter known as the link characteristics parameter carries the resources requirement-related information. This information is basically a traffic descriptor. This traffic descriptor is basically intended to characterize the behavior of the source that will load the new AAL2 connection. A key to reliable utilization of the network resources is the precision of this traffic descriptor. Currently, the link characteristics parameter has four fields which describe the AAL2 source that will load the new AAL2 connection. These four fields are: (1) Maximum CPS-SDU bit rate; (2) Average CPS-SDU bit rate; (3) Maximum CPS-SDU size; and (4) Average CPS-SDU size.

In AAL2 Signaling CS2 [AAL2CS2], there is an option to specify also the quality of service (QoS) requirement of the AAL2 flow. This option specifies the type of underlying ATM VCC, which should be used to carry that particular AAL2 connection. Two QoS classes are supported, stringent and tolerant. The definiition of these ATM QoS cases can be found in ITU-T Recommendation I.356 B-ISDN ATM Layer Cell.

A connection admission control algorithm using the above listed four fields to characterize the traffic can result in very conservative or very optimistic allocation of network resources, depending on the values of the parameters. Connection admission control based on these four fields alone can lead to very low network utilization or overloads.

What is needed, and an object of the present invention, is a technique for more precise characterization of AAL2 traffic in order to enable more reliable connection admission control methods to run in AAL2 nodes.

BRIEF SUMMARY

In a telecommunications network, for establishing or modifying a radio connection a node prepares and sends an AAL2 signaling message for use by a connection admission control function of another node of the telecommunications network. In accordance with the present invention, the AAL2 signaling message includes information regarding a timescale over which at least one bit rate value characterizing the radio connection is defined. The at least one bit rate value which characterizes the connection also characterizes behavior of a source which will load the new AAL2 connection. The information regarding such timescale is herein referred to as the timescale value. Including the timescale value in the AAL2 signaling message facilitates more efficient connection admission control by enabling, e.g., bandwidth requirements of radio connections to take into consideration delay requirements.

In an illustrated example embodiment, the timescale value is a burst inter-arrival time (BIT) bit value. That is, the timescale value is a time which elapses between a beginning of two subsequent bursts of AAL2 CPS (Common Part Sublayer) packets.

In an illustrated example embodiment, the timescale value is a number in a range of between 1 milliseconds and 65535 milliseconds. Preferably the timescale value is included as a field in a same parameter of the AAL2 signaling message that includes the at least one bit rate value. In fact, the timescale value is preferably included as a field in the same parameter of the AAL2 signaling message that includes the following fields: (1) maximum CPS-SDU bit rate; (2) average CPS-SDU bit rate; (3) maximum CPS-SDU size value; and (4) average CPS-SDU size value.

In an example implementation, the telecommunications system is a UTRAN radio access network. In the UTRAN radio access network, examples of the AAL2 signaling message are an Establish Request Message and a Modify Request Message.

The AAL2 signaling message is equipped with a compatibility mechanism which makes possible extending the protocol without causing problems for those AAL2 switches which implement an earlier version.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

As mentioned above, the problem with the prior art, and particularly with using only the four fields of the link characteristics parameter, is that the information so provided in the current version of signaling protocol does not characterize the traffic properly. Since there is no information in the current link characteristics parameter or otherwise about the timescale over which the bit rate parameters are defined, the arrival patterns of the packets on the different connections can not be accurately described. Therefore, bandwidth requirements of connections can not be calculated as a function of the delay requirement.

The problem of the prior art is herein addressed by including, in the AAL2 signaling message, information regarding a timescale over which at least one bit rate value characterizing the radio connection is defined. As explained below, the "at least one bit rate value" which characterizes the connection also characterizes behavior of a source which will load the new AAL2 connection. The information regarding such timescale is herein referred to as the timescale value. Including the timescale value in the AAL2 signaling message facilitates more efficient connection admission control by enabling, e.g., bandwidth requirements of radio connections to take into consideration delay requirements.

Figure 1:
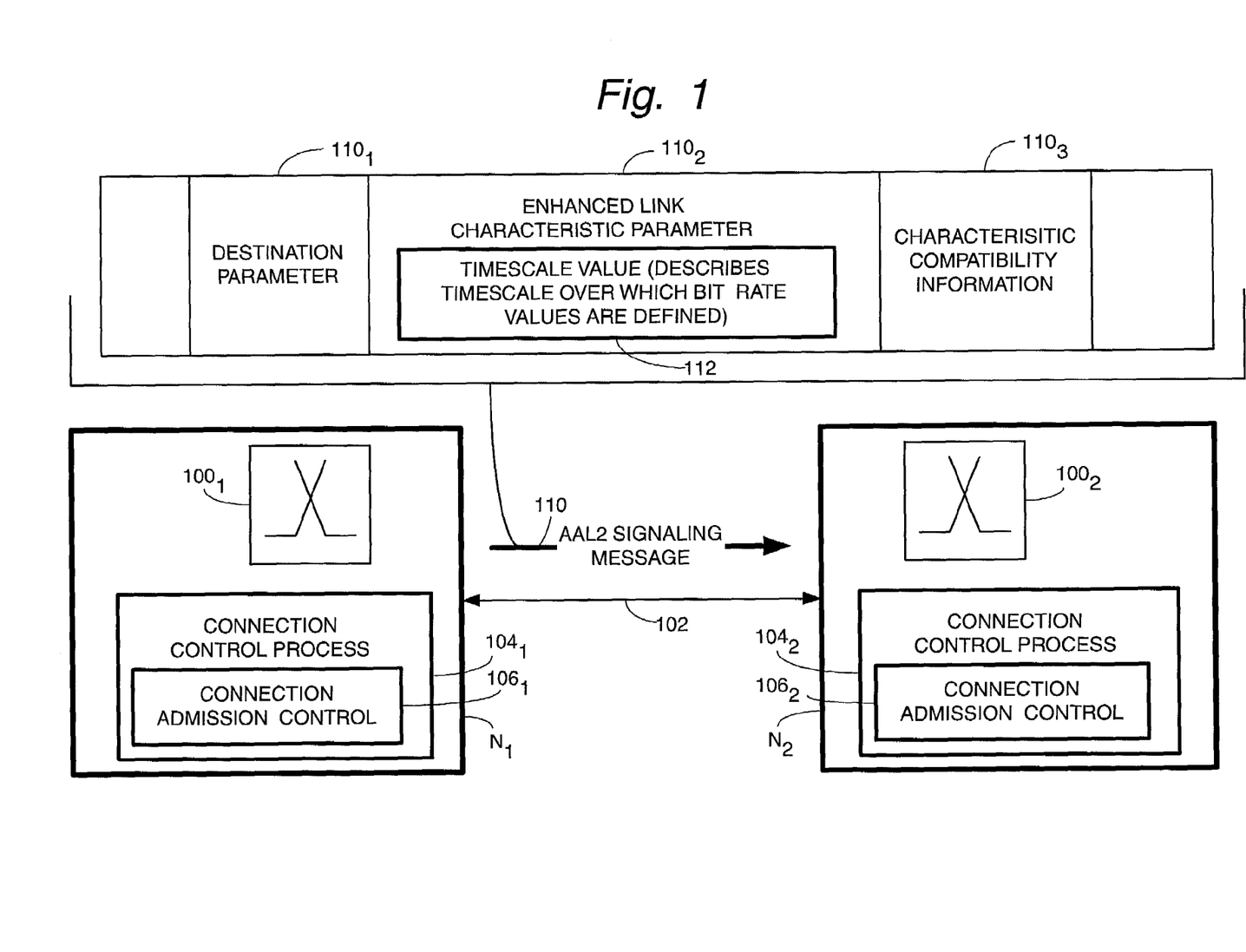
FIG. 1 is a diagrammatic view showing two representative AAL2 switching nodes of a telecommunications network and an example AAL2 signaling message which includes a new parameter.

FIG. 1 shows a portion of a communications network, and particularly illustrates two switched-based nodes $N_1$ and $N_2$. The nodes $N_1$ and $N_2$ are configured to accommodate AAL2 signaling and accordingly include ATM-compatible switches $100_1$ and $100_2$, respectively. The two nodes $N_1$ and $N_2$ are connected by a link 102. Both nodes $N_1$ and $N_2$ include a connection control process 104 as well as a connection admission control function 106. The connection admission control function 106 for each node may be included in the connection control process 104 (as shown in FIG. 1), or may be separate therefrom.

It should be understood that the communications network represented by FIG. 1 is not limited to two nodes, but likely has many other nodes through which connections are established using AAL2 signaling. Yet FIG. 1 suffices to illustrate simply the format, transmission, and utilization of an example advantageous AAL2 signaling message, shown as AAL2 signaling message 110. The AAL2 signaling message 110 is shown in FIG. 1 as being transmitted from node $N_1$ to node $N_2$, but the direction of transmission is not a limiting factor of the present invention since AAL2 signaling message 110 can be transmitted in either direction between two AAL2-handling nodes. Indeed, AAL2 signaling message 110 may travel from an originating node to and through several intermediate nodes of the network before reaching a final destination node.

The AAL2 signaling message 110 is preferably prepared by the connection control process 104 of the sending node, e.g., node $N_1$ in the illustration of FIG. 1. Information supplied in the AAL2 signaling message 110 is particularly beneficial for the connection admission control function 106 of the nodes it traverses (e.g., node $N_2$), hence depiction of the connection admission control function 106 in FIG. 1. FIG. 1 does not attempt to illustrate or describe myriad other functionalities which can be included in such a node, but generally represents the various types of nodes with which the present invention can be utilized.

The AAL2 signaling message 110 can include numerous parameters. The parameters of the AAL2 signaling message 110 pertinent to a basic understanding thereof are shown in exploded fashion in FIG. 1. As illustrated, AAL2 signaling message 110 includes a destination parameter $110_1$ (which is an address or other identifier of a node to which AAL2 signaling message 110 is destined); an enhanced link characteristic parameter $110_2$; and, characteristic compatibility information $110_3$. Briefly mentioned now, and described in more detail hereinafter, is a timescale value field 112 which is included in the enhanced link characteristic parameter $110_2$. The timescale value field 112 is also known herein as the timescale parameter (e.g., a parameter or value which describes a timescale over which bitrate values [such as those also included in enhanced link characteristic parameter $110_2$] are defined).

Figure 2:
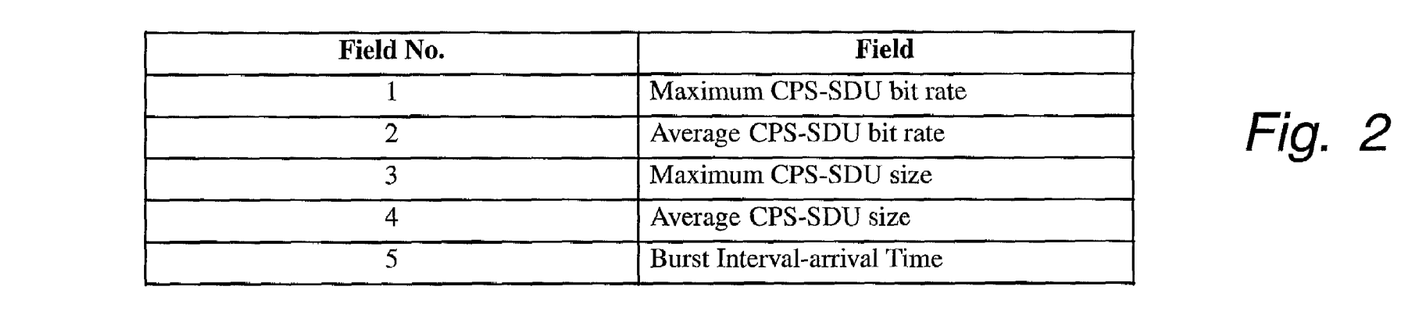
FIG. 2 is a diagrammatic view showing an example format of the new parameter of an AAL2 signaling message.

For one illustrative embodiment, an example format with pertinent fields of the enhanced link characteristic parameter $110_2$ of AAL2 signaling message 110 are shown in FIG. 2. Each of the fields of enhanced link characteristic parameter $110_2$ as shown in FIG. 2 is briefly discussed separately below.

The maximum CPS-SDU bit rate (field 1) is defined as the maximum bandwidth, available to the AAL type 2 served user in the specified direction. The maximum bandwidth is the maximum ratio of the amount of bits transported during the inter-departure time between subsequent CPS-SDUs, and that inter-departure time. Allowed values for the maximum CPS-SDU bit rate are 0 to 2048 kbit/s. The granularity of the maximum CPS-SDU bit rate is 64 bit/s. Herein, by "CPS" is meant the AAL2 Common Part Sublayer (CPS); by "SDU" is meant the Service Data Unit.

The average CPS-SDU bit rate (field 2) is defined as the total expected amount of bits transported in the specified direction during the holding time of the connection, divided by the holding time of the connection. The average bit rate is also expected to be valid for the time interval between any two active periods. Allowed values for the average CPS-SDU bit rate are 0 to 2048 kbit/s. The granularity of the average CPS-SDU bit rate is 64 bit/s.

The maximum CPS-SDU size (field 3) is defined as the largest CPS-SDU size, in octets, allowed to be sent in the specified direction during the holding time of the connection. Allowed values of the maximum CPS-SDU size are 1 to 45.

The average CPS-SDU size (field 4) is defined in the specified direction as the expected number of transported octets divided by the number of transported CPS-SDUs during the holding time of the connection. The average CPS-SDU size is also expected to be valid for the time interval between any two active periods. Allowed values of the average CPS-SDU size are 1 to 45.

Figure 3:
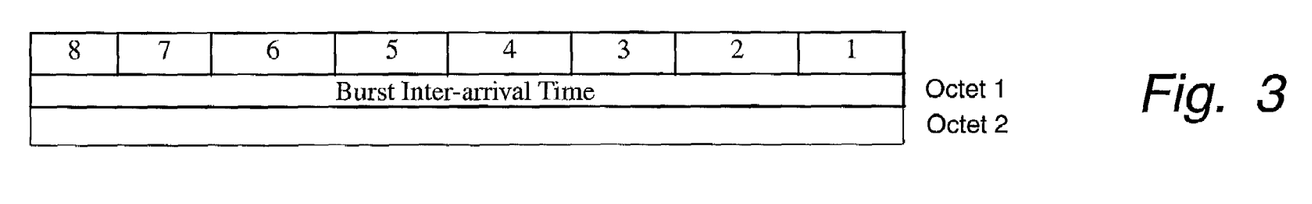
FIG. 3 is a diagrammatic view showing an example format of a timescale field of the new parameter.

In the illustrated example, the timescale value 112 occupies field 5 of enhanced link characteristic parameter $110_2$, and in the example format of FIG. 2 is denominated a burst inter-arrival time (BIT) bit value. That is, the timescale value is a time which elapses between a beginning of two subsequent bursts of AAL2 CPS (Common Part Sublayer) packets. FIG. 3 describes the format of the field 5 in which the timescale value 112 is stored. As shown in FIG. 3, the length of field 5 (and thus the timescale value 112) is two octets. In an illustrated sample embodiment, the timescale value is a number in a range of between 1 milliseconds and 65535 milliseconds. The granularity of the timescale value 112 is 1 ms.

Other than its inclusion of timescale value field 112, the AAL2 signaling message 110 can resemble a conventional link characteristic parameter. That is, field 1 through and including field 4 of AAL2 signaling message 110 are typical components of a link characteristic parameter of a conventional AAL2 signaling message. Thus, preferably the timescale value is included as a field in a same parameter of the AAL2 signaling message that includes the at least one bit rate value.

The values in the first four fields of the enhanced link characteristic parameter $110_2$ characterize the connection which is the subject of the AAL2 signaling message by describing properties of the data that is intended to be carried over the connection. From the perspective of a traffic source model, the values in the first four fields of the enhanced link characteristic parameter $110_2$ can also be said to characterize the behavior of the source that will load the new AAL2 connection. In this regard, in the traffic source model there is typically an endpoint (information source) which generates the data carried over the connection. The behavior of this endpoint/source must be known/understood to be able to set the values in the enhanced link characteristic parameter $110_2$. The traffic source model captures certain important properties of the way such source tends to generate data, and uses these properties to derive values of the enhanced link characteristic parameter $110_2$ for a new connection.

In one example implementation known as the UTRAN, the source which loads the new AAL2 connection is the Medium Access Control (MAC) layer. The MAC layer generates data frames with a certain frame inter-arrival, and these MAC frames are the load of the AAL2 connection, which the connection transports. Thus, when establishing a new connection, the enhanced link characteristic parameter $110_2$ describes the way the source (MAC) generates those data frames (which is, e.g., also a characterization of the new connection itself).

Figure 6:
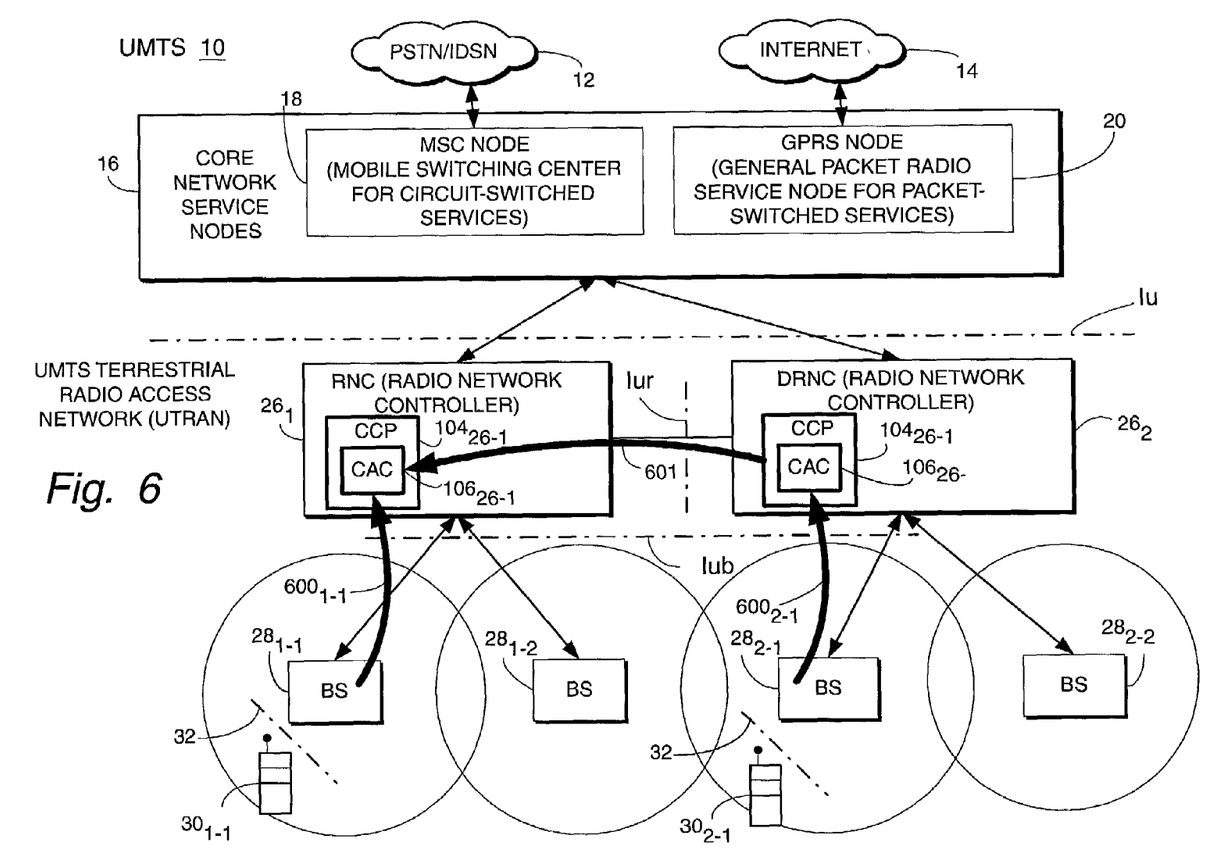
FIG. 6 is diagrammatic view of example mobile communications system in which the example AAL2 signaling message which includes the new parameter may be advantageously employed.

Thus, one example implementation of the invention and the AAL2 signaling message 110 is in the universal mobile telecommunications (UMTS) system 10 shown in FIG. 6. Describing the UMTS and its context briefly, in FIG. 6, a representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 6 is shown with only two RNC nodes, particularly RNC $26_1$ and RNC$26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 6 shows that an RNC can be connected over an Iur interface to one or more other RNCs in the UTRAN 24.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

User equipment units (UE), such as user equipment unit (UE) $30_{1-1}$ and user equipment unit (UE) $30_{2-1}$ shown in FIG. 6, communicate with one or more cells or one or more base stations (BS) 28 over a radio or air interface 32. Each of the radio interface 32, the Iu interface, the Iub interface, and the Iur interface are shown by dash-dotted lines in FIG. 6.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying short data packets, such as web page requests in a web browser application, for example.

As set up by the control channels, traffic channels (TCH) are allocated to carry substantive call communications with a user equipment unit (UE). Some of the traffic channels can be common traffic channels, while others of the traffic channels can be dedicated traffic channels (DCHs).

Figure 7:
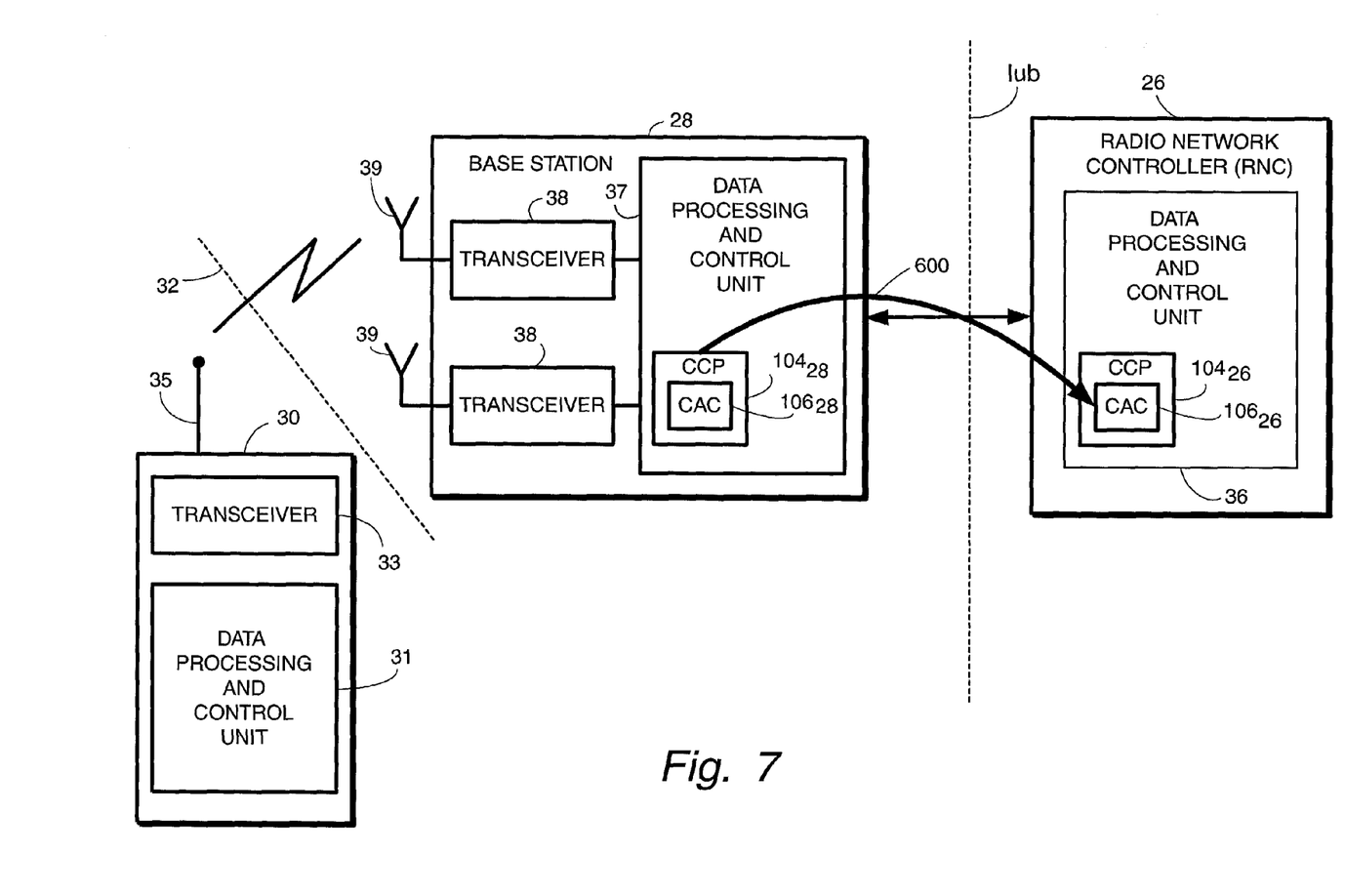
FIG. 7 is a simplified function block diagram of a portion of a UMTS Terrestrial Radio Access Network, including a user equipment unit (UE) station; a radio network controller; and a base station.

FIG. 7 shows selected general aspects of a representative user equipment unit (UE) 30 and illustrative nodes such as radio network controller 26 and base station 28. The representative user equipment unit (UE) 30 shown in FIG. 7 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 7 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

Various nodes of the UTRAN can include the aforementioned connection control process 104 and connection admission control function 106. For example, each of the radio network control (RNC) nodes 26 and base station (BS) nodes 28 of FIG. 6 can each include a connection control process 104 and a connection admission control function 106, e.g., in the connection layer. FIG. 6 specifically shows radio network control (RNC) node $26_1$ having connection control process $104_{26-1}$ and connection admission control function $106_{26-1}$, while radio network control (RNC) node $26_2$ has connection control process $104_{26-2}$ and connection admission control function $106_{26-2}$. Although for sake of simplicity FIG. 6 does not illustrate the base station (BS) nodes 28 as including a connection control process 104 and connection admission control function 106, inclusion of connection control process 104 and connection admission control function 106 is depicted in the representative base station (BS) node 28 shown in FIG. 7. The connection control process 104 and connection admission control function 106 may be implemented using individual hardware circuits, using software functioning in conjunction with a suitably programmed digital microprocessor or general purpose computer, using an application specific integrated circuit (ASIC), and/or using one or more digital signal processors (DSPs), or any combination of the foregoing. In the illustrated embodiment, connection control process 104 and connection admission control function 106 for a radio network control (RNC) node 26 is shown as being realized in included in data processing and control unit 36, while connection control process 104 and connection admission control function 106 for a base station (BS) 28 are illustrated as being realized in included in data processing and control unit 37.

One scenario of operation illustrated by arrow $600_{1-1}$ in FIG. 6 is the sending of an AAL2 signaling message 110 with respect to a new radio connection with user equipment unit (UE) $30_{1-1}$ from base station (BS) $26_{1-1}$ to radio network control (RNC) node $26_1$. A comparable AAL2 signaling message 110 is generically illustrated between a base station 28 and radio network control (RNC) node 26 by arrow 600 in FIG. 7. In such scenario, the AAL2 signaling message $600_{1-1}$ is generated by connection control process $104_{1-1}$ of base station $28_{1-1}$, and utilized by connection admission control function $106_{26-1}$ of radio network control (RNC) node $26_1$.

Another scenario of operation is shown in FIG. 6 by arrow $600_{1-1}$ and arrow 601 for a new radio connection with user equipment unit (UE) $30_{2-1}$. Arrow $600_{1-1}$ and arrow 601 depict two serial AAL2 signaling messages 110 of the present invention. In this second scenario, radio network control (RNC) node $26_1$ controls the radio connection with user equipment unit (UE) $30_{2-1}$, but the radio resources in the cell in which mobile station (MS) $30_{2-1}$ resides are controlled by radio network controller (DRNC) $26_2$ (e.g., radio network controller (DRNC) $26_2$ serves as a drift radio network control node). The first AAL2 signaling message 110, depicted by arrow $600_{1-1}$, is generated by connection control process $104_{2-1}$ of base station (BS) $28_{2-1}$ and is processed by connection admission control function $106_{26-2}$ of drift radio network controller (DRNC) $26_2$. Upon the connection admission control function $106_{26-2}$ of drift radio network controller (DRNC) $26_2$ agreeing to admit the radio connection with mobile station (MS) $30_{2-1}$, the connection control process $104_{26-2}$ of drift radio network controller (DRNC) $26_2$ sends a second AAL2 signaling message 110 (represented by arrow 601) to the connection admission control function $106_{26-1}$ of radio network control (RNC) node $26_1$. If connection admission control function $106_{26-1}$ also agrees to the connection, the radio connection is through connected in the transport layer.

Figure 8:
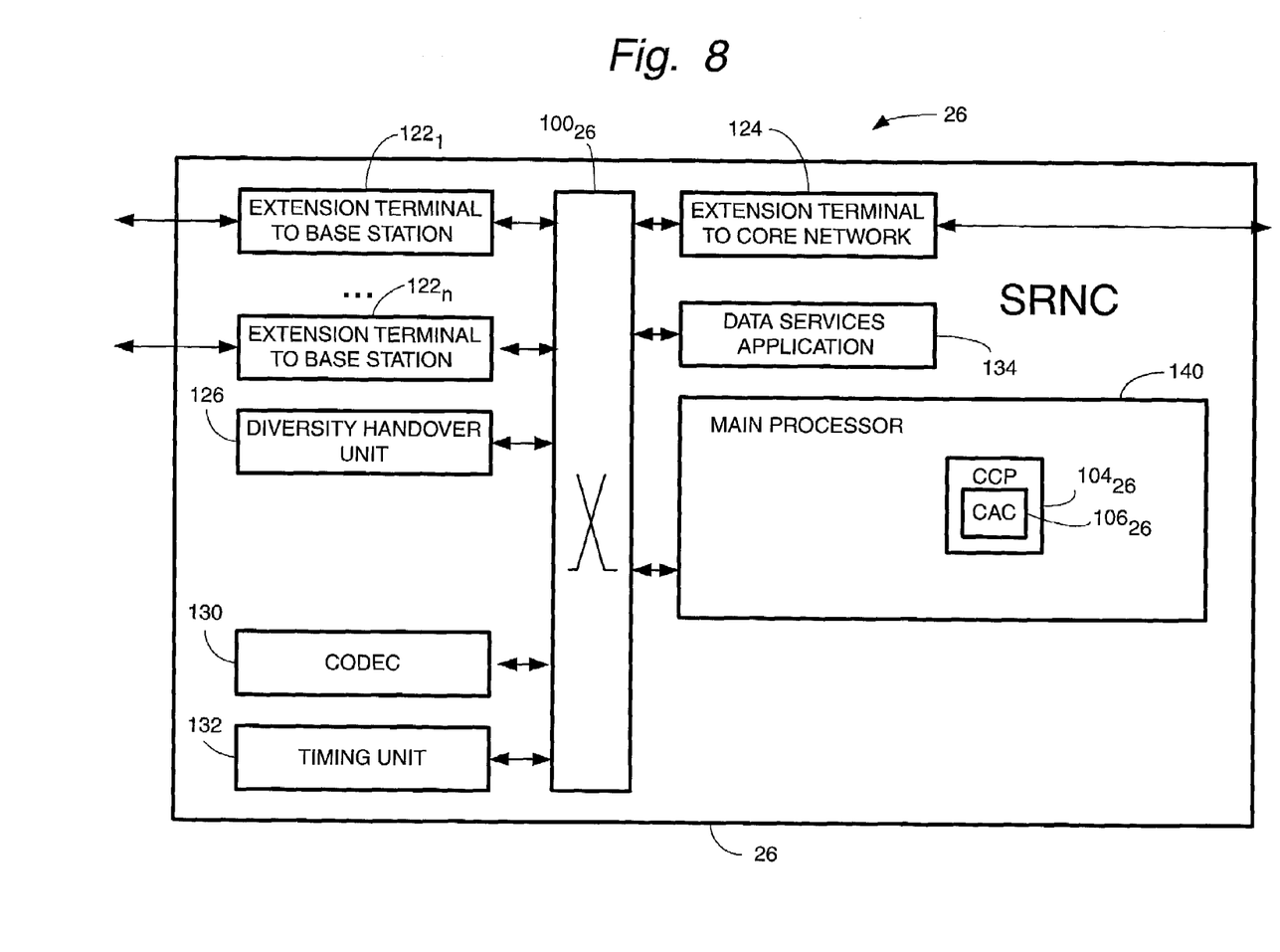
FIG. 8 is a schematic view of an example RNC node in accordance with one example embodiment.

FIG. 8 illustrates, in somewhat more detail, an example non-limiting RNC node 26 of the present invention. RNC node 26 of FIG. 6 is a switched-based node having a switch $100_{26}$. The switch $100_{26}$ serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; codec 130; timing unit 132; a data services application unit 134; and, a main processor 140. The person skilled in the art will appreciate generally the functions of these constituent elements. In the example embodiment of FIG. 8, the functions of connection control process $104_{26}$ and connection admission control function $106_{26}$ are realized by main processor 140, although (as mentioned before) other realizations are well within the scope of the present invention.

Figure 9:
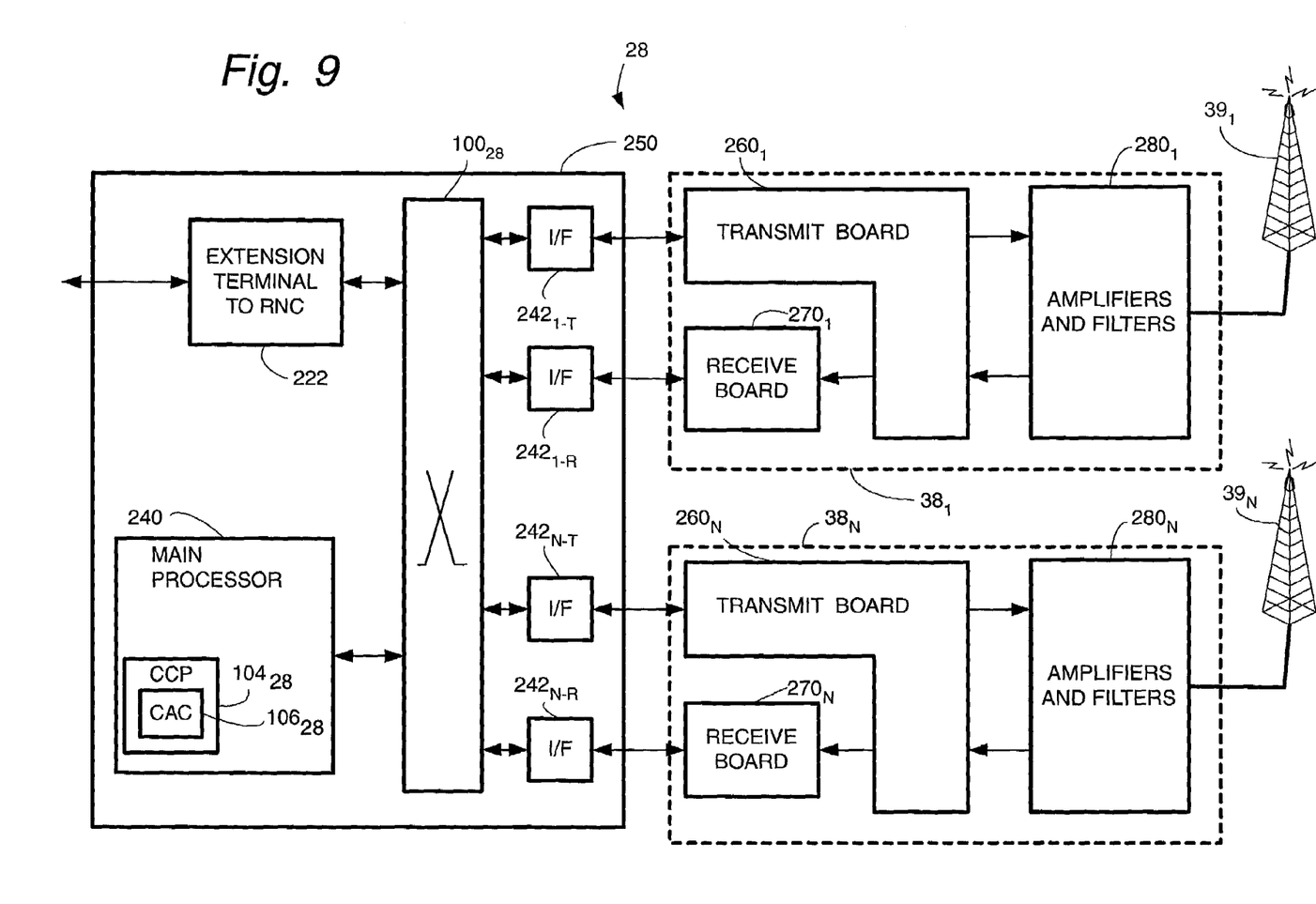
FIG. 9 is a schematic view of an example base station node in accordance with one example embodiment.

FIG. 9 illustrates, in non-limiting manner, more details of an example base station (BS) node 28 in accordance with one embodiment of the present invention. As with RNC node 26, the base station (BS) node 28 of FIG. 9 is a switched-based node having a switch $100_{28}$ which serves to interconnect other constituent elements of base station (BS) node 28. Such other constituent elements include extension terminal 222; ALT unit 228; BS main processor 240, and interface boards 242.

Extension terminal 222 connects base station (BS) node 28 to radio network controller (RNC) node 26, and thus comprises the Iub interface. As in the case of radio network controller (RNC) node 26, the ALT unit 228 is a unit which provides, e.g., multiplexing and demultiplexing and (optionally) queuing with regard to differing protocols of cells.

The embodiment of base station (BS) node 28 illustrated in FIG. 9 is housed in a rack having multiple subracks. Each subrack has one or more boards, e.g., circuit boards, mounted thereon. A first subrack 250 contains boards for each of extension terminal 222; ALT unit 228; BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board $242_{1-T}$ is connected to transmitter board $260_1$, while interface board $242_{1-R}$ is connected to receiver board $270_1$. The pair of transmitter board $260_1$ and receiver board $270_1$ is, in turn, connected to amplifiers and filters board $280_1$. Similar connections exist for a second pairing of transmitter board $260_2$ and receiver board $270_2$, which interface via interface board $242_{2-T}$ and interface board $242_{2-R}$. respectively. Each transceiver 38 of FIG. 7 thus comprises a subrack which includes a transmitter board 260, a receiver board 270, and amplifiers and filters board 280.

In one example embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver sources which it shares with receiver board 270. Each receiver board 270 includes unillustrated elements such as an interface connected to its corresponding interface board 242; a decoder; a demodulator; and, a baseband receiver. Each amplifiers and filters board 280 includes amplifiers, such as MCPA and LNA amplifiers.

In the example base station (BS) node 28 of FIG. 9, the functions of connection control process $104_{26}$ and connection admission control function $106_{26}$ are realized by main processor 240, although (as mentioned before) other realizations are well within the scope of the present invention.

In the example UTRAN, the AAL2 signaling message 110 can be used for Establish Request Message and/or a Modify Request Message, for example. In UTRAN, essentially all traffic is periodic. In other words, a frame arrives in each Transmission Time Interval (TTI). The frame is handled to the AAL2 Service Specific Convergence Sublayer (SSCS) for segmentation into 45 octets long AAL2 Common Part Sublayer (CPS) packets. These CPS packets then transferred via the switched AAL2 network.

The behavior of the AAL2 sources in UTRAN is now more precisely characterized, thereby allowing implementation of much more reliable connection admission control procedures. As explained and illustrated more generically in FIG. 1, the AAL2 signaling message 110 includes the timescale value 112 [e.g., the Burst Inter-arrival Time (BIT)] in the enhanced link characteristic parameter $110_2$ of the AAL2 signaling message 110. These burst of AAL2 CPS packets are resulting from arrival of subsequent SSCS packets that are segmented into AAL2 CPS packets before transmission over the AAL2 connection. In UTRAN for example, the value of the BIT field should be set to the TTI (Transmit Time Interval) of the dedicated radio channel, which is carried by the AAL2 connection.

The timescale value 112, e.g.,. the Burst Inter-arrival Time (BIT), is thus carried in the enhanced link characteristic parameter $110_2$ of AAL2 signaling message 110. As explained before, the timescale value 112 can be used in addition to the other values carried in the traditional link characteristics parameter in AAL2 Signaling CS1, and it can be added to Establish Request, and Modify Request messages in AAL2 Signaling CS2. For UTRAN, the content of the new parameter can be as previously specified in FIG. 2, while the of the new field (timescale value 112) is as illustrated in FIG. 3.

Figure 4:
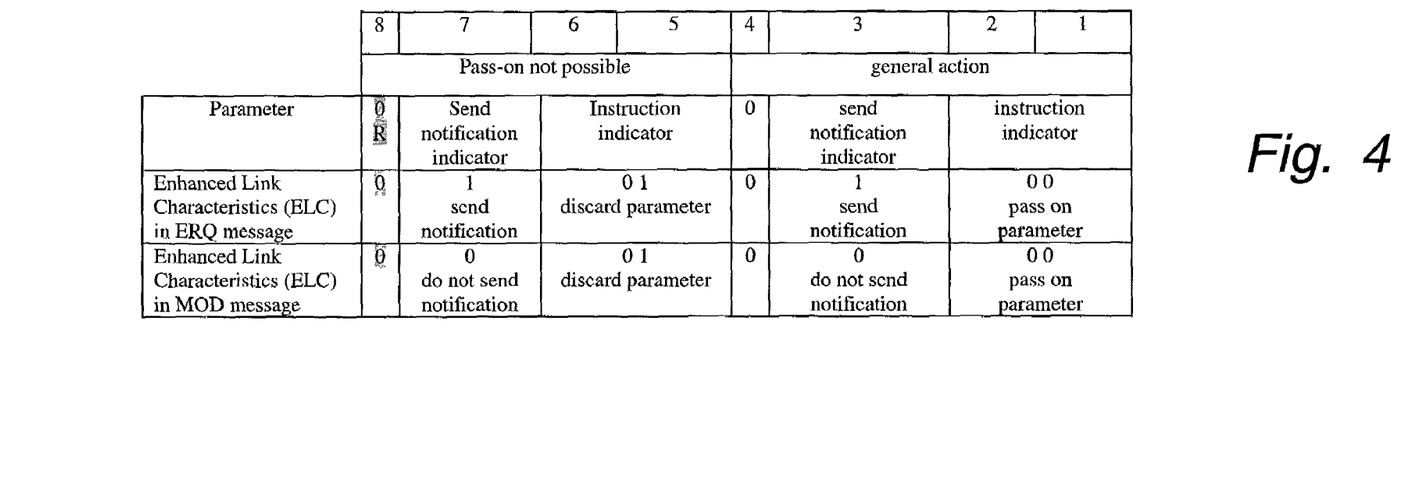
FIG. 4 is diagrammatic view showing an example format of parameter compatibility information.

Fortunately, AAL2 Signaling is equipped with a powerful compatibility mechanism, which makes possible extending the protocol without causing problems for those AAL2 switches which implement an earlier version. The coding of the parameter compatibility information field for the enhanced link characteristic parameter $110_2$ of the AAL2 signaling message 110 is illustrated in FIG. 4. The parameter compatibility information ensures that all the AAL2 switches, which are capable of using the new parameter, can exploit it. All the switches, which are not implementing and handling the new parameter will just forward it to the next hop, and base the connection admission control on other parameters (for example the old Link Characteristics) present in the message. That is, the parameter compatibility information enables switches which are of a vintage to handle only an AAL2 signaling message with a conventional link characteristic parameter to overlook the inclusion of the more sophisticated timescale value 112 and operate as if the timescale value 112 were not present in the AAL2 signaling message 110. Advantageously, therefore, all the procedures specified in Capability Set 1 (CS 1) and Capability Set 2 (CS2) of AAL2 signaling work without any modification, just this new parameter may be taken into account by the AAL2 needs when making the connection admission control decision. This means that the extension proposed here can be implemented as a proprietary solution in a vendor-specific node without causing any interworking problem. In this case however, superior network efficiency (or reliability) will be achieved in those parts of the network where the network resources use that same vendor's equipment as opposed to other parts of the network which are not capable of implementing the AAL2 signaling message 110 of the invention.

In an example analysis of the AAL2 signaling message 110, homogeneous AAL2 connections are multiplexed in an ATM VCC. The traffic is characterized as follows: in each TTI (=40 ms) one bust of 320 bytes is sent in a connection (The AAL2 and ATM headers are not taken into account in this example.) The phases of the packet arrivals on the different connections are uniformly distributed over the TTI.

For sake of comparison, assume in a first case of the example analysis that the traffic descriptors without the timescale value 112 (e.g., BIT) are the following: Maximum CPS-SDU bit rate=64 kbit/sec (320·8/0.04); Average CPS-SDU bit rate=64 kbit/sec; Maximum CPS-SDU size=40 bytes (but is not used in CAC); Average CPS-SDU size=40 bytes (but is not used in CAC). In this case, the connection admission control (CAC) works as follows: Imagine that n connections are currently in the system. If a new connection arrived, CAC checks whether (n+1)*64<C or not. C is the capacity of the ATM VCC in kbit/sec.

Assume further in the example analysis a second case with the traffic descriptors and the timescale value 112 (e.g., BIT) are the following: Maximum CPS-SDU bit rate=64 kbit/sec (320*8/0.04); Average CPS-SDU bit rate=64 kbit/sec; Maximum CPS-SDU size=40 bytes (but is not used in CAC); Average CPS-SDU size=40 bytes (but is not used in CAC); Burst Inter-arrival Time=40 ms. In this case, the size of the bursts arriving in each 40 ms is easy to obtain: Maximum CPS-SDU bit rate. Burst Inter-arrival time=2560 bits. In this second case, connection admission control (CAC) can implement an algorithm that is able to approximate the multiplexing delay. The algorithms solving the $\Sigma D/D/1$ type queues [COST242] can be used for this purpose.

In the above regard, denote the CAC function by f(C, QoS, Maximum CPS-SDU bit rate, Burst Inter-arrival Time, n), where C is the capacity of the ATM VCC in kbit/sec, QoS is the delay requirement in milliseconds, and n is the number of connections. If the delay requirement can be fulfilled (the probability that the packet delay is larger than QoS is below a threshold) having n connections in the system, the value of f( ) is ACCEPT, and otherwise REJECT.

Figure 5:
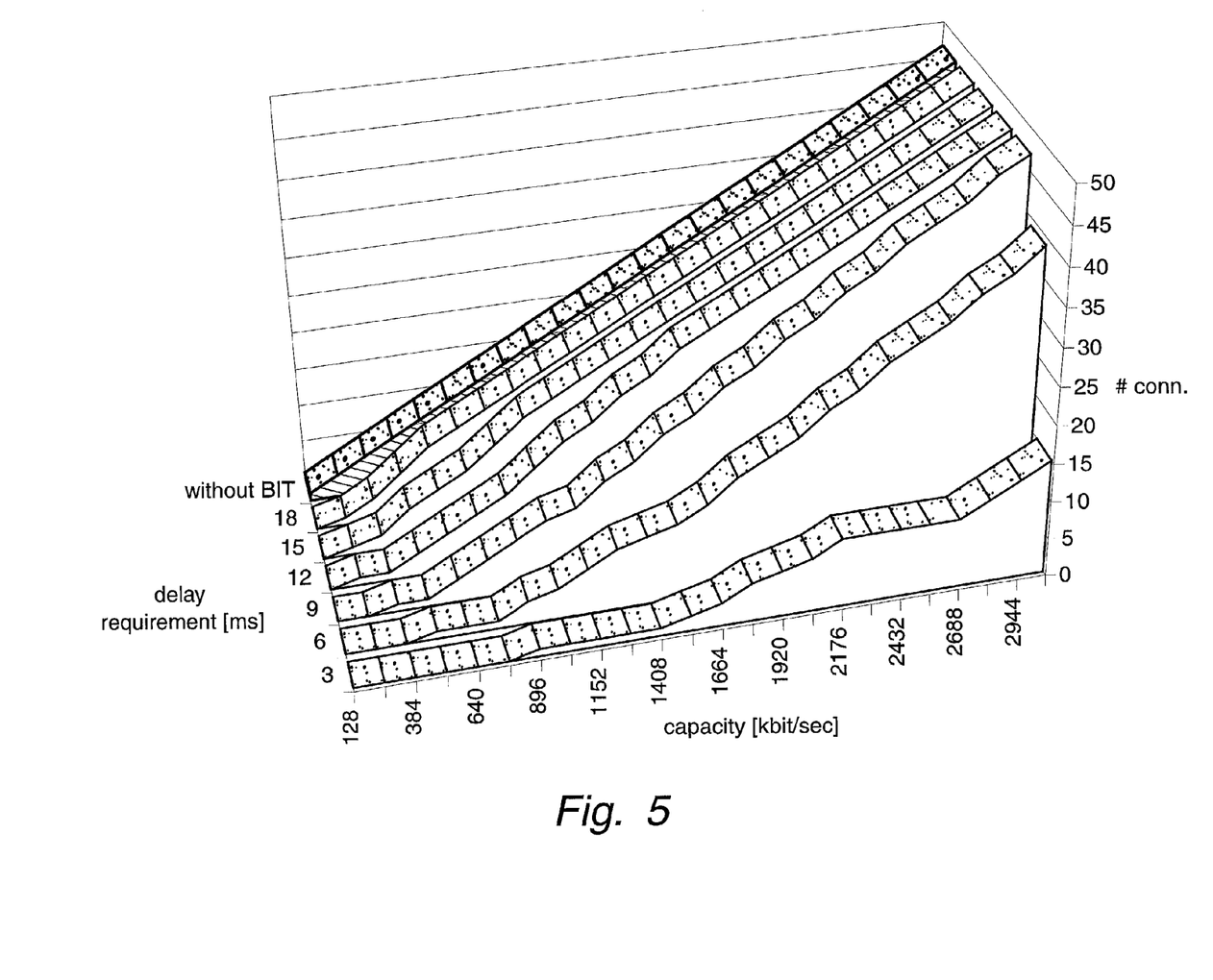
FIG. 5 is a three dimensional graph showing a number of connections that can be admitted in a scenario pertinent.

The number of connections that can be admitted using the above methods is illustrated in FIG. 5. FIG. 5 shows that a connection admission control (CAC) function which uses the timescale value 112 (e.g., BIT parameter) is more reliable. Having strict delay requirements (less than 20 ms) and relatively low-capacity links, the connection admission control (CAC) using the timescale value 112 is more conservative. It means that the connection admission control (CAC) which does not use the timescale value 112 underestimates the required capacity in this region. In the region where FIG. 5 has linearity, the two connection admission controls (CACs) give identical results. This is because large enough links can almost be fully utilized with the given traffic.

Delay approximations in case of mixing connections with different timescale values 112 (e.g., BITs) and "Maximum CPS-SDU bit rate" parameters are possible.

The present invention thus provides an extension of AAL2 Signaling which enables the implementation of more reliable connection admission control methods. The AAL2 signaling message 110 provides a proprietary solution without causing any inter-working problem in multi-vendor scenarios.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A node of a telecommunications network which prepares an AAL2 signaling message for use by a connection admission control function of another node of the telecommunications network in conjunction with establishment or modification of a telecommunications connection, the connection being characterized by at least one bit rate value, and wherein the node includes in the AAL2 signaling message information regarding a timescale over which the bit rate value is defined; wherein the information regarding the timescale over which the bit rate value is defined is a burst inter-arrival time bit value, the burst inter-arrival time bit value being a time which elapses between a beginning of two subsequent bursts of AAL2 CPS (Common Part Sublayer) packets.

2. The node of claim 1, wherein the AAL signaling message is an Establish Request Message.

3. The node of claim 1, wherein the AAL signaling message is a Modify Request Message.

4. The node of claim 1, wherein the information regarding the timescale over which the bit rate value is defined is included as a field in a same parameter of the AAL2 signaling message that includes the at least one bit rate value.

5. The node of claim 1, wherein the at least one bit rate value is one of a maximum CPS-SDU bit rate and an average CPS-SDU bit rate.

6. The node of claim 1, wherein the information regarding the timescale over which the bit rate value is defined is included as a field in a same parameter of the AAL2 signaling message that includes a CPS-SDU size value characterizing the connection.

7. The node of claim 1, wherein the node is a node of a radio access network of a telecommunications system.

8. The node of claim 1, wherein the information regarding the timescale over which the bit rate value is defined has a value in a range of between 1 milliseconds and 65535 milliseconds.

9. The node of claim 1, wherein the at least one bit rate value which characterizes the connection characterizes behavior of a source which will load the new AAL2 connection.

10. A node of a telecommunications network which prepares an AAL2 signaling message for a connection, the AAL2 signaling message being one of an Establish Request Message and a Modify Request Message, the connection being characterized by at least one bit rate value, and wherein the node includes in the AAL2 signaling message information regarding a timescale over which the bit rate value is defined; wherein the information regarding the timescale over which the bit rate value is defined is a burst inter-arrival time bit value, the burst inter-arrival time bit value being a time which elapses between a beginning of two subsequent bursts of AAL2 CPS (Common Part Sublayer) packets.

11. The node of claim 10, wherein the information regarding the timescale over which the bit rate value is defined is included as a field in a same parameter of the AAL2 signaling message that includes the at least one bit rate value.

12. The node of claim 10, wherein the at least one bit rate value is one of a maximum CPS-SDU bit rate and an average CPS-SDU bit rate.

13. The node of claim 10, wherein the information regarding the timescale over which the bit rate value is defined is included as a field in a same parameter of the AAL2 signaling message that includes a CPS-SDU size value characterizing the connection.

14. The node of claim 10, wherein the node is a node of a radio access network of a telecommunications system.

15. The node of claim 10, wherein the information regarding the timescale over which the bit rate value is defined has a value in a range of between 1 milliseconds and 65535 milliseconds.

16. The node of claim 10, wherein the at least one bit rate value which characterizes the connection characterizes behavior of a source which will load the new AAL2 connection.

17. A telecommunications network comprising:
a first node which prepares an AAL2 signaling message in conjunction with establishment or modification of a telecommunications connection, the connection being characterized by at least one bit rate value, the first node including in the AAL2 signaling message information regarding a timescale over which the bit rate value is defined;
a second node which uses the information regarding the timescale over which the bit rate value is defined to make a connection admission decision wherein the information regarding the timescale over which the bit rate value is defined is a burst inter-arrival time bit value, the burst inter-arrival time bit value being a time which elapses between a beginning of two subsequent bursts of AAL2 CPS (Common Part Sublayer) packets.

18. The telecommunications network of claim 17, wherein the AAL signaling message is an Establish Request Message.

19. The telecommunications network of claim 17, wherein the AAL signaling message is a Modify Request Message.

20. The telecommunications network of claim 17, wherein the information regarding the timescale over which the bit rate value is defined is included as a field in a same parameter of the AAL2 signaling message that includes the at least one bit rate value.

21. The telecommunications network of claim 17, wherein the at least one bit rate value is one of a maximum CPS-SDU bit rate and an average CPS-SDU bit rate.

22. The telecommunications network of claim 17, wherein the information regarding the timescale over which the bit rate value is defined is included as a field in a same parameter of the AAL2 signaling message that includes a CPS-SDU size value characterizing the connection.

23. The telecommunications network of claim 17, wherein the first node and the second node are nodes of a radio access network of a telecommunications system.

24. The telecommunications network of claim 17, wherein the information regarding the timescale over which the bit rate value is defined has a value in a range of between 1 milliseconds and 65535 milliseconds.

25. The telecommunications network of claim 17, wherein the at least one bit rate value which characterizes the connection characterizes behavior of a source which will load the new AAL2 connection.

26. For use in a telecommunications network having at least a first node and a second node, a method of establishing a connection, the connection being characterized by at least one bit rate value, a method comprising:
preparing, at the first node, an AAL2 signaling message for use by a connection admission control function of the second node;
including, in the AAL2 signaling message, information regarding a timescale over which the bit rate value is define;
using the information regarding a timescale over which the bit rate value is defined to make a connection admission control decision at the second node; and
wherein the information regarding the timescale over which the bit rate value is defined is a burst inter-arrival time bit value, the burst inter-arrival time bit value being a time which elapses between a beginning of two subsequent burst of AAL2 CPS (Common Part Sublayer) packets.

27. The method of claim 26, wherein the AAL signaling message is an Establish Request Message.

28. The method of claim 26, wherein the AAL signaling message is a Modify Request Message.

29. The method of claim 26, wherein the information regarding the timescale over which the bit rate value is defined is included as a field in a same parameter of the AAL2 signaling message that includes the at least one bit rate value.

30. The method of claim 26, wherein the at least one bit rate value is one of a maximum CPS-SDU bit rate and an average CPS-SDU bit rate.

31. The method of claim 26, wherein the information regarding the timescale over which the bit rate value is defined is included as a field in a same parameter of the AAL2 signaling message that includes a CPS-SDU size value characterizing the connection.

32. The method of claim 26, wherein the information regarding the timescale over which the bit rate value is defined has a value in a range of between 1 milliseconds and 65535 milliseconds.

33. The method of claim 26, wherein the at least one bit rate value which characterizes the connection characterizes behavior of a source which will load the new AAL2 connection.

* * * * *